(12) United States Patent
Chiong et al.

(10) Patent No.: US 9,587,074 B2
(45) Date of Patent: Mar. 7, 2017

(54) MULTI-STAGE PROCESS FOR FORMING POLYARYLENE SULFIDES

(71) Applicant: Ticona LLC, Florence, KY (US)

(72) Inventors: Hendrich Chiong, Florence, KY (US);
Michael Haubs, Florence, KY (US);
Damian Feord, Florence, KY (US);
Stanley Leonard, Florence, KY (US);
Jacob Grayson, Florence, KY (US);
Venkata Nekkanti, Florence, KY (US)

(73) Assignee: Ticona LLC, Florence, KY (US)

(*) Notice: Subject to any disclaimer, the term of this patent is extended or adjusted under 35 U.S.C. 154(b) by 0 days.

(21) Appl. No.: 14/481,257

(22) Filed: Sep. 9, 2014

(65) Prior Publication Data

US 2015/0087776 A1    Mar. 26, 2015

Related U.S. Application Data

(60) Provisional application No. 61/882,348, filed on Sep. 25, 2013, provisional application No. 61/917,463, filed on Dec. 18, 2013.

(51) Int. Cl.
*C08G 75/14* (2006.01)
*B01J 19/00* (2006.01)
(Continued)

(52) U.S. Cl.
CPC .......... *C08G 75/14* (2013.01); *B01J 19/0046* (2013.01); *B01J 19/1862* (2013.01);
(Continued)

(58) Field of Classification Search
CPC ..................................................... C08G 75/14
(Continued)

(56) References Cited

U.S. PATENT DOCUMENTS 3,869,433 A    3/1975    Campbell
4,038,259 A    7/1977    Campbell et al.
(Continued)

FOREIGN PATENT DOCUMENTS

EP    2 322 485 A1    5/2011
JP    H07228699    8/1995
(Continued)

OTHER PUBLICATIONS

International Patent Application No. PCT/US2014/54734; International Search Report and Written Opinion dated Nov. 25, 2014; (7 pages).
(Continued)

*Primary Examiner* — Duc Truong
(74) *Attorney, Agent, or Firm* — Dority & Manning, P.A.

(57) ABSTRACT

A multi-stage process and system for formation of a polyarylene sulfide is described. The multi-stage process can include at least three separate formation stages that can take place in three different reactors. The first stage of the formation process can include reaction of an alkali metal sulfide with an organic amide solvent to form a complex including a hydrolysis product of the solvent and an alkali metal hydrogen sulfide. The second stage of the formation process can include reaction of the complex formed in the first stage with a dihaloaromatic monomer to form a prepolymer, and the third stage can include further polymerization of the prepolymer with additional monomers to form the final product.

29 Claims, 2 Drawing Sheets

(51) Int. Cl.
  *B01J 19/18* (2006.01)
  *C08G 75/00* (2006.01)
(52) U.S. Cl.
  CPC ........... *B01J 2208/00176* (2013.01); *B01J 2208/00274* (2013.01); *B01J 2208/00283* (2013.01); *B01J 2208/00539* (2013.01); *B01J 2219/0013* (2013.01)
(58) Field of Classification Search
  USPC ............... 528/373, 314; 524/606; 422/134
  See application file for complete search history.

(56) References Cited

U.S. PATENT DOCUMENTS

| | | |
|---|---|---|
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,370,470 A | 1/1983 | Vidaurri et al. |
| 4,393,197 A | 7/1983 | Edmonds, Jr. |
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 2003/0150804 A1 | 8/2003 | Haubs et al. |
| 2004/0249118 A1 | 12/2004 | Kagoshima et al. |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07242746 | 9/1995 |
| JP | H07292107 | 11/1995 |
| JP | H07316428 | 12/1995 |
| JP | H07330911 | 12/1995 |
| JP | H0820644 | 1/1996 |
| JP | H0820645 | 1/1996 |
| JP | H08100064 | 4/1996 |
| JP | H08118502 | 5/1996 |
| JP | H08118503 | 5/1996 |
| JP | H08134216 | 5/1996 |

(56) References Cited

FOREIGN PATENT DOCUMENTS

| | | |
|---|---|---|
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/0147141 | 10/2013 |

OTHER PUBLICATIONS

International Patent Application No. PCT/US2014/54741; International Search Report and Written Opinion dated Nov. 25, 2014; (7 pages).
International Patent Application No. PCT/US2014/54724; International Search Report and Written Opinion dated Dec. 8, 2015; (6 pages).
International Patent Application No. PCT/US2014/54728; International Search Report and Written Opinion dated Jan. 16, 2015; (11 pages).
International Patent Application No. PCT/US2014/54745; International Search Report and Written Opinion dated Nov. 25, 2015; (7 pages).
International Patent Application No. PCT/US2014/54750; International Search Report and Written Opinion dated Jan. 22, 2014; (11 pages).

MULTI-STAGE PROCESS FOR FORMING POLYARYLENE SULFIDES

CROSS REFERENCE TO RELATED APPLICATIONS

The present application claims filing benefit of U.S. Provisional Patent application 61/882,348 having a thing date of Sep. 25, 2013; and U.S. Provisional application 61/917,463 having a filing date of Dec. 18, 2013, which are incorporated herein by reference in their entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent.

The formation of polyarylene sulfides includes several distinct stages including the formation of a low molecular weight prepolymer followed by a second polymerization stage in which the molecular weight of the prepolymer is increased to form the final product. The formation is generally carried out in a batch-wise formation process in a single reactor. As such, the complete cycle time is at least the sum of all stages of the process, which can be quite long. Moreover, in order to be economically feasible, large reactors are required that must meet the specifications for the most stringent conditions of the process, i.e., the materials, pressure and temperature specifications of the single large reactor must be capable of withstanding the most stringent stage of the process, even though other stages may not require such exacting specifications.

What is needed in the art is a method and system for formation of polyarylene sulfides that can reduce cycle time and operating costs. Such improvements can improve capital efficiency and decrease pay-back time for an industrial-scale plant.

SUMMARY OF THE INVENTION

A multi-stage method is disclosed for forming a polyarylene sulfide. For instance, a method can include reacting a complex including an alkali metal organic amine carboxylic acid salt and an alkali metal hydrogen sulfide with a dihaloaromatic monomer to form a polyarylene sulfide prepolymer. Thereafter, the method can include increasing the molecular weight of the polyarylene sulfide prepolymer to form the polyarylene sulfide via reaction of the prepolymer with a second dihaloaromatic monomer and a sulfur-containing monomer in an organic amide solvent. This reaction can be carried out under nearly anhydrous conditions such that the molar ratio of water to the sulfur-containing monomer throughout this reaction is less than about 0.2.

Also disclosed is a system for carrying out the disclosed method. For instance, the system can include a first reactor within which the organic amide solvent and the alkali metal sulfide can be reacted to form the complex. The first reactor can include a first outlet for removal of vapor from the first reactor to maintain a low operating pressure in the first reactor. The first reactor can include a second outlet for removal of the complex from the first reactor and subsequent delivery of the complex to a second reactor of the process for forming a polyarylene sulfide prepolymer. The second reactor can include an inlet through which the complex formed in the first reactor can be delivered. The second reactor can also include an inlet for the dihaloaromatic monomer, a first outlet for removal of the prepolymer from the second reactor and subsequent delivery of the prepolymer to a third reactor and a second outlet for removal of vapor from the second reactor. The third reactor can be used for forming the final polyarylene sulfide polymer. The third reactor can include an inlet for receiving the prepolymer formed in the second reactor and an inlet for receiving a dihaloaromatic monomer. The third reactor can also include a first outlet for removal of the formed polymer from the third reactor and a second outlet for removal of vapor from the third reactor.

In one embodiment, the sulfur-containing monomer can be supplied to the third stage in the form of the complex that includes the alkali metal organic amine carboxylic acid salt and the alkali metal hydrosulfide. According to this embodiment, the system can also include a line from the first reactor for delivery of the complex from the first reactor to the third reactor.

BRIEF DESCRIPTION OF THE FIGURES

The present disclosure may be better understood with reference to the following figures.

DETAILED DESCRIPTION

Figure 1:
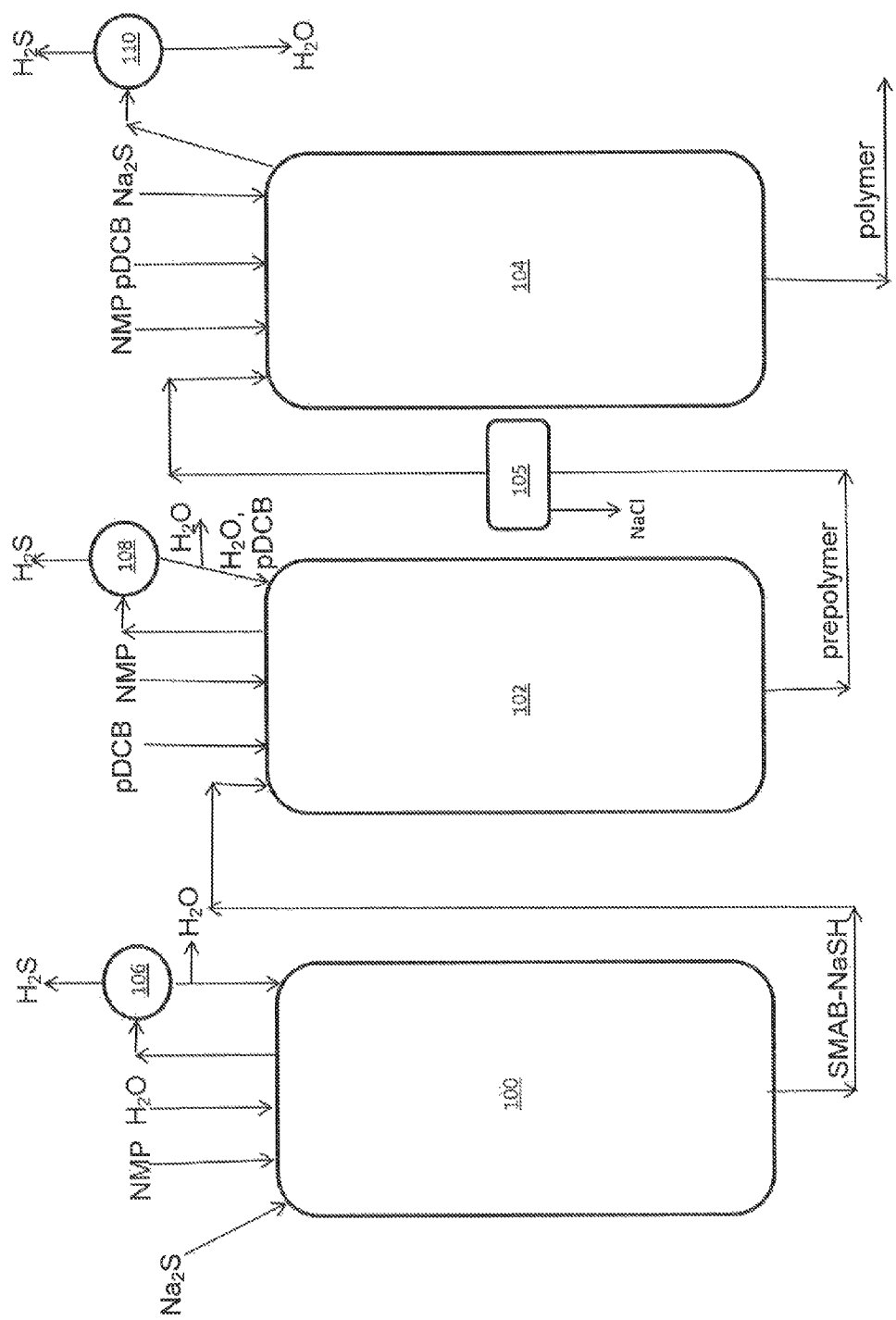
FIG. 1 is a flow diagram for an embodiment of a polyarylene sulfide formation process as described herein.

It is to be understood by one of ordinary skill in the art that the present discussion is a description of exemplary embodiments only, and is not intended as limiting the broader aspects of the present invention.

The present disclosure is generally directed to methods of forming a polyarylene sulfide and systems as may be utilized in carrying out the methods. More specifically, disclosed is a multi-stage process and system for formation of a polyarylene sulfide. In general, a polyarylene sulfide as may be formed according to the process can be a polyarylene thioether containing repeat units of the formula (I):

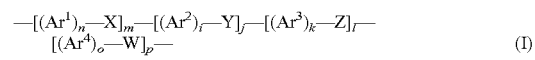

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (—AR—S—) units. In one embodiment the polyarylene sulfide includes at least 85 mol % sulfide linkages attached directly to two aromatic rings. In one embodiment, the polyarylene sulfide formed by the process can be a polyphenylene sulfide, defined herein as containing the phenylene sulfide structure —$(C_6H_4$—S$)_n$— (wherein n is an integer of 1 or more) as a component thereof.

The multi-stage process can include at least two separate formation stages. One stage of the formation process can include reaction of a complex that includes a hydrolysis product of an organic amide solvent and alkali metal hydrogen sulfide with a dihaloaromatic monomer to form a prepolymer. Another stage of the process can include further polymerization of the prepolymer to form the final product. Optionally, the process can include yet another stage in which the organic amide solvent and an alkali metal sulfide are reacted to form the complex. Optionally, the different stages can take place in different reactors. The utilization of separate reactors for each of the stages can decrease cycle time, as the total cycle time can be equal to that of the slowest stage, rather than the sum of all stages as in a single reactor system. In addition, the utilization of separate reactors can decrease capital costs, as smaller reactors can be utilized than would be necessary for the same size batch in a single reactor system. Moreover, as each reactor need only meet the specifications of the stage being carried out in that reactor, a single, large reactor that meets the most stringent parameters of all stages of the formation process is no longer necessary, which can further decrease capital costs.

During the formation process, the final stage of the process during which the molecular weight of the polymer is increased can be carried out at near anhydrous conditions. The near anhydrous conditions of the final stage reaction allows for this stage of the formation process to be carried out at a constant, relatively low pressure, as high pressure during this stage can be caused primarily by the vaporization of water during the polymerization. Lower pressure during this stage can further reduce capital costs of the system, since the reactor need not meet high pressure standards required for previously known systems. Lower operating pressure during a stage can reduce reactor costs by allowing for more economical vessel pressure ratings and less expensive materials of construction. The lower pressure of one or more stages of the formation process can also decrease safety risks.

FIG. 1 illustrates one embodiment of a multi-stage formation process. The first reactor 100 can be utilized for a first stage of the process during which an organic amide solvent and an alkali metal sulfide can react to form a complex that includes a hydrolysis product of the organic amide solvent (e.g., an alkali metal organic amine carboxylic acid salt) and an alkali metal hydrosulfide.

Exemplary organic amide solvents as may be used in a forming the polyarylene sulfide can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The alkali metal sulfide can be, for example, lithium sulfide, sodium sulfide, potassium sulfide, rubidium sulfide, cesium sulfide or a mixture thereof. An alkali metal sulfide can also be generated in situ. For instance, a sodium sulfide hydrate can be prepared within the first reactor 100 from sodium hydrogen sulfide and sodium hydroxide that can be fed to the reactor. When a combination of alkali metal hydrogen sulfide and alkali metal hydroxide are fed to the reactor 100 to form the alkali metal sulfide, the molar ratio of alkali metal hydroxide to alkali metal hydrogen sulfide can be between about 1.00 and about 1.03. In addition, a small amount of an alkali metal hydroxide can be included in the first reactor 100 to remove or react impurities (e.g., to change such impurities to harmless materials) such as an alkali metal polysulfide or an alkali metal thiosulfate, which may be present in a very small amount with the alkali metal sulfide.

In the embodiment illustrated in FIG. 1, the feed to the first reactor 100 can include sodium sulfide ($Na_2S$) (which can be in the hydrate form), N-methyl-2-pyrrolidone (NMP) and water. Reaction between the water, sodium sulfide and the NMP can form a complex including sodium methylaminobutyrate (SMAB—a hydrolysis product of NMP) and sodium hydrogen sulfide (NaSH) (SMAB-NaSH) according to the following reaction scheme:

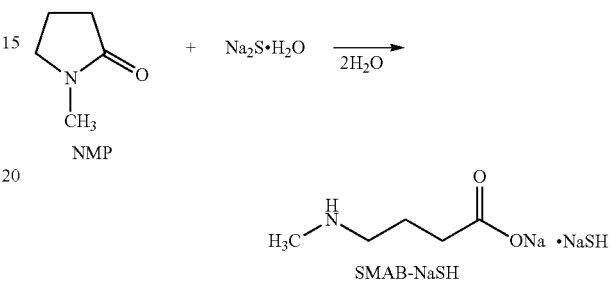

According to one embodiment, a stoichiometric excess of the alkali metal sulfide can be utilized in the first stage reactor, though this is not a requirement of the formation stage. For instance, the molar ratio of organic amide solvent to sulfur in the feed can be from about 2 to about 4, or from about 2.5 to about 3. The molar ratio of water to sulfur in the feed can be from about 2 to about 4, or from about 2.5 to about 3.

During the formation of the complex, the pressure within the first reactor 100 can be held at or near atmospheric pressure. To maintain the low pressure reaction conditions, vapor can be removed from the reactor. The main constituents of the vapor can include water and hydrogen sulfide by-product. As illustrated in FIG. 1, hydrogen sulfide of the vapor can be separated for instance at a condenser 106. As mentioned, in one embodiment, the reactor feed can include a stoichiometric excess of the alkali metal sulfide. In this embodiment, the product solution including the SMAB-NaSH complex will be a highly alkaline solution. This can be of benefit in one embodiment as the highly alkaline SMAB-NaSH solution can act as an absorber for the hydrogen sulfide in the first reactor 100 and can lower loss of hydrogen sulfide in the vapor stream from the reactor 100.

A portion of the water that is separated at condenser 106 can be returned to the reactor 100 to maintain the reaction conditions. Another portion of the water can be removed from the process so as to dehydrate the SMAB-NaSH solution formed in the first stage. For instance, the molar ratio of water to NaSH (or the ratio of oxygen to sulfur) in the product solution of the first reactor 100 can less than about 1.5, or can be between about 0.1 and about 1 such that the SMAB-NaSH complex solution that is fed to the second stage reactor 102 is near-anhydrous.

The reactor utilized in the first stage can be stainless steel, though improved corrosion can be obtained by use of other materials such as a nickel-based alloy or titanium. The materials in the first reactor 100 can be heated to a temperature of, for example, between about 140° and about 220° C., for instance from about 150° C. to about 215° C., or from about 165° C. to about 210° C. during the complex formation reaction. The complex formation reaction is an exothermic reaction, and suitable temperature control mechanisms can be utilized to maintain desired reaction conditions, as needed. The reaction can be carried out in a batch-wise or continuously.

The SMAB-NaSH complex can be fed to the second reactor 102 in conjunction with a dihaloaromatic monomer and a suitable solvent so as to form the polyarylene sulfide prepolymer in the second stage of the process. A dihaloaromatic monomer can be, without limitation, a dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic monomers may be used either singly or in any combination thereof. Specific exemplary dihaloaromatic monomers can include, without limitation, p-dichlorobenzene; m-dichlorobenzene; o-dichlorobenzene, 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic monomer can be fluorine, chlorine, bromine or iodine, and two halogen atoms in the same dihaloaromatic monomer may be the same or different from each other. In one embodiment, o-dichlorobenzene, m-dichlorobenzene, p-dichlorobenzene or a mixture of 2 or more monomers thereof is used as the dihaloaromatic monomer.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

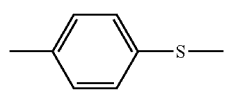
(II)

and segments having the structure of formula (III):

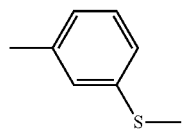
(III)

or segments having the structure of formula (IV):

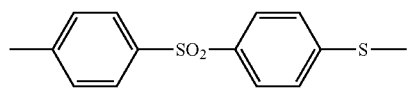
(IV)

In another embodiment, a copolymer can be formed and a monomer can be charged to the system having the formula (V):

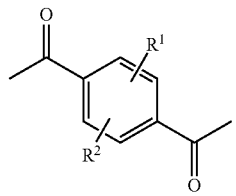
(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives Another monomer as may be charged to the system can have a structure of the formula (VI):

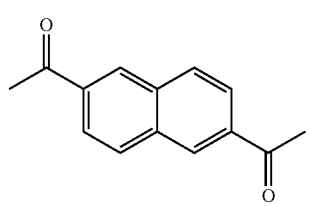
(VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

(VII)

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups.

By way of example, monomer components used in forming a semi-linear polyarylene sulfide can include an amount of polyhaloaromatic monomers having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic monomers having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

In the illustrated embodiment, the dihaloaromatic monomer can include p-dichlorobenzene (pDCB), as shown. In general, the amount of the dihaloaromatic monomer(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

The dihaloaromatic monomer can be charged into the second reactor with a relatively low molar ratio of the dihaloaromatic monomer to the alkali metal hydrogen sulfide of the complex. For instance, the ratio of the dihaloaromatic monomer to sulfur charged to the second reactor can be from about 0.8 to about 1.5, or from about 1.0 to about 1.2. The relatively low ratio of the dihaloaromatic monomer to the alkali metal hydrogen sulfide of the complex can be favorable for the formation of the final high molecular weight polymer via the condensation polymerization reaction.

The ratio of solvent to sulfur in the second stage can also be relatively low. For instance, the ratio of the alkali metal hydrogen sulfide of the complex to the organic amide solvent in the second stage (including the solvent added to the second reactor and solvent remaining in the complex solution from the first reactor) can be from about 2 to about 2.5. This relatively low ratio can increase the concentration of reactants in the second reactor, which can increase the relative polymerization rate and the per volume polymer production rate.

The second stage reaction can be carried out under an inert atmosphere, such as nitrogen, and at increased pressure. For instance, the pressure in the second reactor 102 during the second stage can be from about 500 kPa to about to about 1600 kPa, from about 600 kPa to about 1500 kPa, or from about 700 kPa to about 1400 kPa.

The second reactor 102 can include a vapor outlet for removal of vapor during the second stage in order to maintain the desired pressure level. For instance, the second reactor can include a pressure relief valve as is known in the art. Vapor removed from the second stage can be condensed and separated as at separator 108, for instance to recover unreacted monomer for return to the reactor 102. A portion of the water of the vapor can be removed to maintain the near-anhydrous conditions of the second stage, and a portion of the water can be returned to the second reactor. A small amount of water in the second reactor can generate reflux in the top of the reactor 102, which can improve separation between the water phase and the organic solvent phase in the reactor. This can in turn minimize loss of the organic solvent in the vapor phase removed from the reactor 102 as well as minimize loss of hydrogen sulfide in the vapor stream due to absorption of the hydrogen sulfide by the highly alkaline organic solvent as discussed previously.

The second stage polymerization reaction can generally be carried out at a temperature of from about 200° C. to about 280° C., or from about 235° C. to about 260° C. The duration of the second stage can be, e.g., from about 0.5 to about 15 hours, or from about 1 to about 5 hours.

The termination of the second stage polymerization reaction is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

$$\text{Conversion rate} = A/B*100$$

Wherein A is the total weight of salt collected after removal of the residual polymer and other species other than salt by-product; B is the theoretical weight of salt which is two times the molar amount of the effective sulfide present during the polymerization.

Following the second stage polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus for use in the second stage is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The second reactor 102 can be stainless steel, though improved corrosion can be obtained by use of other materials such as a nickel-based alloy or titanium.

Following the second stage polymerization reaction, the product solution that exits second stage reactor 102 can include the prepolymer, the solvent, and one or more salts that are formed as a by-product of the polymerization reaction. For example, the proportion by volume of the prepolymer solution exiting the second stage reactor 102 of salt that is formed as a byproduct to the reaction can be from about 0.05 to about 0.25, or from about 0.1 to about 0.2.

Salts included in the reaction mixture can include those formed as a byproduct during the reaction as well as other salts added to the reaction mixture, for instance as a reaction promoter. The salts can be organic or inorganic, i.e. can consist of any combination of organic or inorganic cations with organic or inorganic anions. They can be at least partially insoluble in the reaction medium and have a density different from that of the liquid reaction mixture.

According to one embodiment, at least a portion of the salts in the prepolymer mixture that exits the second stage reactor 102 can be removed from the mixture at a separation unit 105 prior to the third stage polymerization in third stage reactor 104. Removal of salts prior to final polymerization can simplify final polymer separation processes as well as increase the reaction rate of the third stage polymerization as a lower sulfur to solvent ratio may be used in the third stage, effectively increasing the polymer concentration and formation rate. In addition, by carrying out a salt separation process prior to the third stage polymerization reaction, the capacity of the third reactor for the reactants can be increased.

The separation method utilized at separation unit 105 to remove salts from the prepolymer solution is not particularly limited. For instance, the salts can be removed by use of screens or sieves as has been utilized in traditional separation processes. A salt/liquid extraction process can alternatively or additionally be utilized in separating the salt from the prepolymer solution. In one embodiment, a hot filtration process can be utilized in which the solution can be filtered at a temperature at which the prepolymer is in solution and the salts are in the solid phase.

According to one embodiment, a salt separation process can remove about 95% or more of the salts including in the prepolymer solution that exits the second reactor 102. For instance greater than about 99% of the salts can be removed from the prepolymer solution.

Following the prepolymer polymerization reaction in the second stage of the process and the filtration process, a third stage of the formation can take place during which the molecular weight of the prepolymer is increased in a third reactor 104. Input to the third reactor 104 can include the prepolymer solution from the second reactor 102 in addition to solvent, one or more dihaloaromatic monomers, and a sulfur-containing monomer. For instance, the amount of the sulfur-containing monomer added in third stage can be about 10% or less of the total amount required to form the product polyarylene sulfide. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The dihaloaromatic monomers added to the third stage can be the same or different as the dihaloaromatic monomers added in the second stage. For example, it is possible to include a monohalo monomer (not necessarily an aromatic compound) in one or both of the second or the third stage in order to form end groups of the polyarylene sulfide or to regulate the polymerization reaction and/or the molecular weight of the polyarylene sulfide.

In one embodiment, it has been found that the product polyarylene sulfide can have a lower yellowness index through addition of a dihaloaromatic monomer (e.g., pDCB) to the third stage during which the molecular weight of the polymer is increased. For instance a dihaloaromatic monomer may be added in an amount of about 2% by weight or less with respect to the amount of polyarylene sulfide formed in the process, or about 1.5% or less in one embodiment. Through addition of a dihaloaromatic monomer during the third stage; the yellowness index can be about 15 or less, about 12 or less, or about 10 or less in some embodiments. Yellowness index can be determined by use of a spectrophotometer following the procedure of ASTM E313 (illuminant D65; 10 degree observer).

The third reaction conditions can be nearly anhydrous, with the ratio of water to the sulfur-containing monomer less than about 0.2, for instance between 0 and about 0.2. The low water content during the third stage of the process can increase the polymerization rate and the polymer yield as well as reduce formation of undesired side reaction by-products as the conditions are favorable for nucleophilic aromatic substitution, as discussed above. Moreover, as pressure increases in the third stage are generally due to water vaporization, low water content during this stage can allow the third reaction to be carried out at a constant, relatively low pressure, for instance less than about 1500 kPa. As such, the third reactor 104 need not be a high pressure reactor; which can provide substantial cost savings to a formation process as well as decrease safety risks inherent to high pressure reactors.

The reaction conditions within the third reactor 104 can also include a relatively low molar ratio for the solvent to the sulfur-containing monomer. For instance, the ratio of solvent to sulfur-containing monomer can be from about 2 to about 4, or from about 2.5 to about 3.

The third reactor 104 can include a vapor outlet for removal of vapor during the third stage in order to maintain the low pressure in the reactor. For instance, the third reactor can include a pressure relief valve as is known in the art. Vapor removed from the third stage can be condensed and separated as at separator 110 that can separate, e.g., hydrogen sulfide from water of the vapor. The removal of the water can also help to maintain the desired near-anhydrous conditions in the third reactor 104.

The reaction mixture of the third stage can be heated to a temperature of from about 120° C. to about 280° C., or from about 200° C. to about 260° C. and the polymerization can continue until the melt viscosity of the thus formed polymer is raised to the desired final level. The duration of the second polymerization step can be, e.g., from about 0.5 to about 20 hours, or from about 1 to about 10 hours. The weight average molecular weight of the formed polyarylene sulfide can vary as is known, but in one embodiment can be from about 1000 g/mol to about 500,000 g/mol, from about 2,000 g/mol to about 300,000 g/mol, or from about 3,000 g/mol to about 100,000 g/mol.

The polymerization reaction apparatus for use in the third stage is not especially limited, and can be the same or different as the reaction apparatus utilized in the second stage, e.g., a reaction apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The third reactor 104 can be stainless steel, though improved corrosion can be obtained by use of other materials such as a nickel-based alloy or titanium.

Following the third stage, and any desired post-formation processing, the polyarylene sulfide may be discharged from the third reactor 104, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

Figure 2:
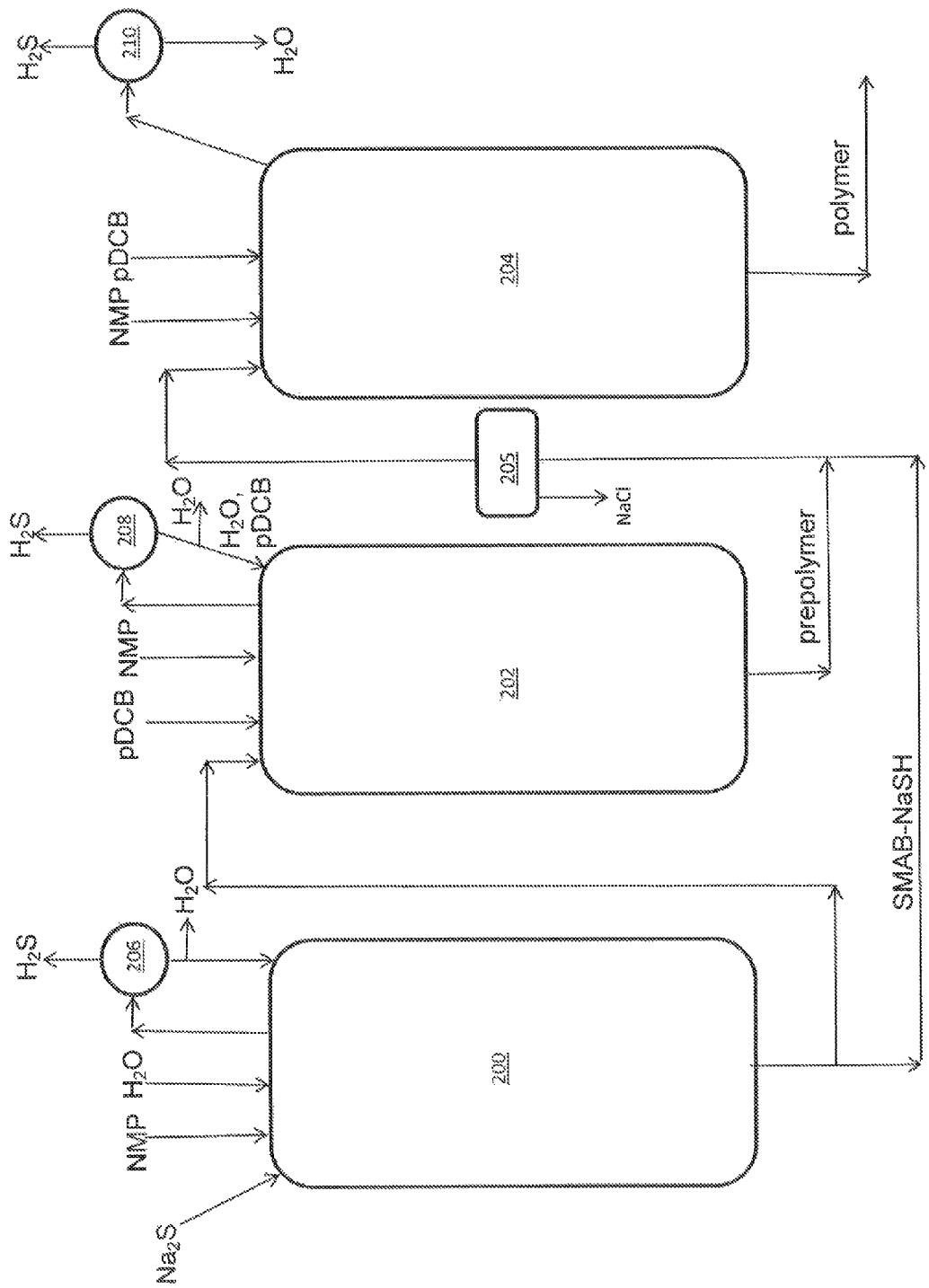
FIG. 2 is a flow diagram for another embodiment of a polyarylene sulfide formation process as described herein.

FIG. 2 illustrates another embodiment of the multi-stage polyarylene sulfide formation process. As can be seen, this process is similar to the multi-stage process of FIG. 1 and includes a first reactor 200, a second reactor 202 and a third reactor 204. The feed to the first reactor can include a sulfur-containing monomer, such as an alkali metal sulfide (e.g., $Na_2S$), an organic amide solvent (e.g., NMP), and water. The reactor 200 can include a vapor treatment stream including a condenser 206 similar to that of FIG. 1. The monomer complex formed in the first reactor 200 can be fed to the second reactor in conjunction with a dihaloaromatic monomer (pDCB) and solvent (NMP) to form a prepolymer. As shown, the second reactor can include a vapor treatment stream including a condenser 208 similar to that of FIG. 1. The prepolymer solution that exits the second reactor 202 can be subjected to salt separation as at separation unit 205 before entering the third reactor 204, as discussed above.

As illustrated in FIG. 2, according to this embodiment, the sulfur-containing monomer fed to the third reactor 204 can include the complex including the hydrolysis product of the solvent and an alkali metal hydrosulfide that was formed in the first stage of the process at the first reactor 200. Utilization of the complex formed in the first stage of the process in both the second and third polymerization stages of the process can improve overall efficiency of the process and decrease costs of the process. The complex formed in the first stage can be fed to the third reactor 204 in conjunction with a dihaloaromatic monomer and additional solvent and the molecular weight of the prepolymer formed in the second stage can be increased as desired. As shown, the third reactor 204 can include a vapor treatment stream including a condenser 210 and water can be removed from the third reactor in order to maintain desired near-anhydrous conditions and low pressure during the third stage.

Following the third stage polymerization reaction, post treatment as is generally known in the art can be carried out to purify or otherwise improve the characteristics of the polyarylene sulfide formed by the process. For example, a second filtration process can be carried out that can remove any additional salt from the product mixture, for instance any salt formed as the molecular weight of the prepolymer is increased during the third stage polymerization. In one embodiment, the polyarylene sulfide can be subjected to a crystallization process.

Following formation, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

A polyarylene sulfide formed according to the multi-stage process can exhibit beneficial characteristics. For instance, the melt viscosity of the neat polymer (i.e., no additives) as determined according to ISO Test No. 11443 at 310° C. and 1,200/seconds can be from about 200 Poise to about 700 Poise, or from about 220 Poise to about 650 Poise, in one embodiment. The bulk density of the polymer can generally be between about 0.2 grams per cubic centimeter and about 1.5 grams per cubic centimeter, for instance between about 0.3 grams per cubic centimeter and about 1 gram per cubic centimeter as determined according to ISO Test No. 1183 (technically equivalent to ASTM D792). The volatile content of the polymer can be about 0.5 wt % or less, for instance about 0.2 wt. % or less, based upon weight loss following vacuum drying.

The crystallization temperature, $T_{c2}$ can be between about 190° C. and about 300° C., for example between about 200° C. and about 265° C., as determined by differential scanning calorimetry, for instance as described in ISO Standard 10350. The pH of the formed polymer can generally be between about 3 and about 12. The polyarylene sulfide can also have a good appearance. For instance, the polyarylene sulfide can have a yellowness index of less than about 18.5 as determined according to ASTM e313.

The process can form a polyarylene sulfide with a good particle size distribution. For instance, the $d_{10}$ value can be from about 15 micrometers to about 30 micrometers, the $d_{50}$ value can be from about 70 micrometers to about 100 micrometers, and the $d_{90}$ value can be from about 100 micrometers to about 150 micrometers. The median diameter of the particles can be from about 100 micrometers to about 1000 micrometers. In one embodiment, about 95% or more of the particles can be between about 50 micrometers and about 150 micrometers in particle size. For instance, about 0.5 wt. % or less of the particles can have a diameter of greater than about 2800 micrometers, and about 10 wt. % or less of the polymers can have a diameter of less than about 110 micrometers.

The polyarylene sulfide can be utilized in forming products as are generally known in the art. For instance, the polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in mixture in conventional amounts.

A mixture that is melt processed to form a melt processed polyarylene sulfide composition may include a polyarylene sulfide (or a blend of multiple polyarylene sulfides) in an amount from about 40 wt. % to about 90 wt. % by weight of the mixture, for instance from about 45% wt. % to about 80 wt. % by weight of the mixture.

The polyarylene sulfide may be melt processed according to techniques known in the art. For example, the polyarylene sulfide may be melt-kneaded in conjunction with one or more additives in a single-screw or multi-screw extruder at a temperature of from about 250° C. to about 320° C. In one embodiment, the polyarylene sulfide may be melt processed in an extruder that includes multiple temperature zones. For instance, the polyarylene sulfide may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

Shaped articles that may be formed including the polyarylene sulfide may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including the polyarylene sulfide can be used in a variety of electrical and electronic applications such as, for example, connectors and over-molding (insert-molding) parts is encompassed.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Test Methods

Melt Viscosity:
The melt viscosity (Pa-s) was determined in accordance with ISO Test No. 11443 at 350° C. and at a shear rate of 1000 s$^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Crystallization Temperatures:
The crystallization temperature ("$T_{c2}$") was determined by differential scanning calorimetry ("DSC") as is known in the art. The recrystallization temperature was determined from the cooling exotherm in the cooling cycle. Under the DSC procedure, samples were heated and cooled at 20° C. per minute as stated in ISO Standard 10350 using DSC measurements conducted on a TA Q2000 Instrument.

Chlorine Content:
Chlorine content was determined according to an elemental analysis using Parr Bomb combustion followed by Ion Chromatography.

Yellowness Index:
The yellowness index was determined an accord with ASTM E313 (illuminant D65; 10 degree observer).

Example 1

A first reactor was charged with 40.3 kg of 61% sodium sulfide (about 2.78-hydrate), which corresponds to 315 mole of sulfide; plus 25 kg NMP, which corresponds to 252 mole of NMP. The first reactor was then heated to 170° C., where a clearly observable exotherm indicated that the reaction between sodium sulfide and NMP took place to form the complex of sodium-methylaminobutyrate (SMAB, a hydrolysis product of NMP) and sodium hydrogensulfide (NaSH).

The second reactor was charged with 32 kg of NMP and heated to 180° C. At this point the addition of DCB was started at a rate of 30 kWh and the reactor heated further. At 200° C. the addition of the SMAB-NaSH complex was started at the same rate. The complex was added to the middle section of a wash and distillation column directly flanged to the reactor top. After about 15-20% of the monomers had been added and the reactor had reached 230° C. the addition of the monomers was slowed down for about 20 minutes. This time was to account for an induction time of the PPS polymerization reaction that is a direct result of its apparently auto-catalytic behavior. After the induction period the monomer addition rates were again increased to 30 kWh and the reaction temperature controlled at 234° C.

The pressure inside the second reactor was kept constant at around 350 kPa superatmospheric by a pressure relief valve at the column top. Vapors passing the valve were condensed and phase separated into a heavier DCB phase and a lighter aqueous phase. The DCB phase was completely pumped back onto the column top, in order to keep proper control over the stoichiometry. A part of the water phase was also withdrawn and pumped back to the column together with the DCB. Typically the reflux pumping rate was close to 20 kg/h. It was controlled so that the boiling temperature of water at the predetermined reaction pressure was observed close to the column top.

After the monomer addition had been completed the pressure relief valve was closed and the stage two mixture was allowed to react for about 90 min. in order to maximize conversion to the prepolymer. The second reactor was vented to 350 kPa and the hot filtration of the salt started at 235° C. Filtration rates were 3000-5000 l/m$^2$ h after the filter cake had built up to about 300 mm height. The filtrate was collected in a stirred pressure vessel heated to 240° C., in order to keep the prepolymer in solution. The salt filter cake was washed twice with 20 liters of NMP, which was preheated to at least 230° C. in the polymerization reactor. These wash filtrates rich in PPS were added to the first filtrate. A third wash with 30 liters of NMP followed. This dilute wash filtrate was collected separately and not reused.

The filtrate containing the prepolymer was transferred back into the polymerization reactor, which functioned as the third reactor. The temperature was lowered to 220° C. 15 mole of SMAB-NaSH complex was added, the temperature increased to 245° C. and kept at this temperature for 90 min. reaction time in the third reaction stage.

30 liters of NMP were then added to obtain a ratio of NMP/PPS≈4 mole/monomer unit, which yielded reliable results in the cooling crystallization. About 15 moles of acetic acid were added.

The reaction mixture was rapidly cooled to 225° C. and then crystallized under careful temperature control (~20° C. difference between oil jacket and slurry temperature) until the reactor temperature fell below 190° C. Further cooling to about 80° C. was again done fast. At this temperature the slurry was transferred into a nutsche type filter and the mother liquor filtered off. The product was washed once with 30 liters of NMP. Then it was washed with water until the conductivity of the wash filtrate was below 1 mS/cm. Finally the polymer was dried at 90° C. under vacuum.

Eight samples were run and tested for various characteristics as described in the table below.

|  | Sample No. | | | | | | | |
| --- | --- | --- | --- | --- | --- | --- | --- | --- |
|  | 1 | 2 | 3 | 4 | 5 | 6[1] | 7 | 8 |
| Melt viscosity (Pa-s) | 4 | 10 | 39 | 22 | <3 | n.d. | 8 | 16 |
| $T_{c2}$ (° C.) | 235 | 230 | 206 | 216 | 243 | — | 244[2] | 240[2] |
| Organically bound chlorine (wt %) | 0.26 | 0.41 | 0.23 | 0.37 | 0.24 | n.d. | 0.40 | 0.48 |
| pressure throughout stage 2 (kPa) | 400 | 350 | 50 | 350 | 400 | 325 | 350 | 350 |

[1]The polymer was not isolated due to a bad crystallization result.
[2]The polymer was crystallized after acetic acid neutralization.

The crystallization temperature $T_{c2}$ was increased when acetic acid was added to the reaction mixture prior to the cooling crystallization. Sample 8 has clearly higher $T_{c2}$ as compared to Sample 2 and Sample 4 with about equivalent melt viscosity. Crystallization in pH-neutral or mildly acidic medium was advantageous for the polymer.

The amount of organically bound chlorine in the polymer represents the chain end groups that are available for further reaction with sulfide (in stage three) and thus molecular weight increase. Note that the chlorine value is about 0.4 w % for almost all polymers with MV<20 Pa-s. Since a typical chlorine prepolymer has about 1.0-1.2 w % organically bound chlorine, only about 50% of the reactive chlorine end groups have been consumed by sulfide in stage three. This indicates further potential for molecular weight increase via addition of more sodium sulfide in stage three. Sample 6 has higher melt viscosity and thus lower chlorine value.

Pressure in the second stage (prepolymer formation stage) was found to be of significant interest. Sample 5 and Sample 2 were kept at 400 kPa in the second stage, while all the other batches were done at lower pressure. Higher pressure led to higher water content of the reacting mixture. This leads to more chlorine end groups being consumed in side reactions. As a result, low molecular weight polymer with low chlorine content was formed. On the other hand at 400 kPa, less $Na_2S$ was included in the precipitating NaCl and less $H_2S$ was lost overhead as compared to batches kept at lower pressure in the second stage.

In a typical batch the following cycle times were utilized for the unit operations:

| | |
| --- | --- |
| Heating from 160° C. to 230° C.: | 45 min. |
| SMAB-NaSH complex formation Period: | 20 min. |
| Monomer addition at 235° C.: | 120 min |
| Stage two polymerization: | 100 min. |
| Venting and Hot Filtration: | 45 min. |
| Three NMP washes: | 45 min. |
| Transfer to third reactor, sulfide charging, heating to 245° C. | 40 min. |
| Stage three reaction time: | 90 min. |
| Crystallization and cooling to <180° C. | 70 min. |
| Total: | 535 min. |

Example 2

A 2 liter pressure reactor was charged with 443.7 g NMP, 20.3 g $H_2O$ and 84.9 g NaOH (96.4%). The reactor was sealed and heated to 100° C. To this mixture was added 155.86 g of NaSH (containing 71.4% NaSH and 0.7% $Na_2S$). The reactor was heated to 205° C. to form the SMAB-NaSH mixture and 75 ml of distillate containing water and NMP was collected.

To this SMAB-NaSH mixture was added a pre-heated mixture of para-dichlorobenzene (p-DCB) in NMP (74% solution by weight). The reactor was sealed and the temperature allowed to rise to 235° C. and held for 1 hour. The temperature was then increased to 245° C. and held for another 3 hours for formation of the prepolymer.

Following formation of the prepolymer, the reactor was maintained at 350 kPa and the hot filtration of the salt started at 235° C. Filtration rates were 3000-5000 l/m² h after the filter cake had built up to about 300 mm height. The filtrate was collected in a stirred pressure vessel heated to 240° C., in order to keep the prepolymer in solution. The salt filter cake was washed thrice with 300 g of NMP, which was preheated to at least 230° C. in the polymerization reactor. These wash filtrates rich in PPS were added to the first filtrate.

The filtrate containing the prepolymer was transferred back into the polymerization reactor for further polymerization. The temperature was lowered to 220° C. The filtrate was concentrated to 20% solids by means of a flash distillation at 235° C. to remove all unreacted pDCB, $H_2O$ byproduct, excess NMP and other volatiles.

Additional SMAB-NaSH complex was added. Additional NMP was added to obtain a ratio of NMP/PPS≈4 mole/monomer unit, and about 15 moles of acetic acid were added.

In two of the runs, no additional dihaloaromatic monomer was added to this third stage. In two other runs, PDCB was added in an amount of 1.25% by weight with regard to the weight of polyphenylene sulfide formed in the process.

The final polymerization was conducted by heating the reactor to 245° C. and holding the temperature for 1 hour then raising the temperature to 260° C. and holding it for 3 hours. After the hold time, 90 grams of water was added via a pump and the pressure of the reactor was increased from 100 psi up to 270 psi. After the addition, the temperature was allowed to cool down to obtain a granular PPS polymer. To isolate the PPS, the slurry was filtered and washed once with 1 L NMP followed by 1 L of 3% acetic acid in water at 60° C. then 3 times with 80° C. water. The washed polymer was dried at 104° C. vacuum oven.

The four samples were examined for yellowness index. The samples in which there was no additional dihaloaromatic monomer added to the third stage were found to have a yellowness index of 15.29 and 17.93, respectively. The samples in which PDCB was added to the third stage were found to have a yellowness index of 9.4 and 7.8, respectively.

While certain representative embodiments and details have been shown for the purpose of illustrating the subject invention, it will be apparent to those skilled in this art that various changes and modifications may be made therein without departing from the scope of the subject invention.

What is claimed is:

1. A multi-stage method for forming a polyarylene sulfide comprising:
providing a complex that includes an alkali metal organic amine carboxylic acid salt and an alkali metal hydrogen sulfide;
carrying out a first polymerization reaction in a first reactor during which the complex is reacted with a dihaloaromatic monomer in the presence of an organic amide solvent to form a polyarylene sulfide prepolymer, wherein the first reactor is maintained at a pressure of from about 500 to about 1,600 kilopascals for at least a portion of the first polymerization reaction;
thereafter, carrying out a second polymerization reaction in a second reactor during which the polyarylene sulfide prepolymer is reacted with a dihaloaromatic monomer and a sulfur-containing monomer to form the polyarylene sulfide; and
removing vapor from the second reactor to maintain a pressure of less than about 1,500 kilopascals for at least a portion of the second polymerization reaction.

2. The method of claim 1, wherein the sulfur-containing monomer is sodium sulfide or sodium hydrogen sulfide.

3. The method of claim 1, wherein the dihaloaromatic monomer in the first polymerization reaction, the second polymerization reaction, or both comprises dichlorobenzene.

4. The method of claim 1, further comprising reacting a monomer having three or more reactive functional groups with the dihaloaromatic monomer and the complex to form the polyarylene sulfide prepolymer.

5. The method of claim 1, the method further comprising removing vapor from the first reactor during the formation of the polyarylene sulfide prepolymer.

6. The method of claim 1, wherein the prepolymer has a weight average molecular weight of from about 500 grams per mole to about 30,000 grams per mole.

7. The method of claim 1, wherein the reaction forming the polyarylene sulfide prepolymer also forms a salt, the method further comprising separating the salt from the prepolymer.

8. The method of claim 1, wherein the amount of the sulfur-containing monomer combined with the polyarylene sulfide prepolymer is about 10% or less of the total amount required to form an amount of the polyarylene sulfide.

9. The method of claim 1, wherein the amount of the dihaloaromatic monomer combined with the polyarylene sulfide prepolymer is about 2% or less with respect to the weight of the polyarylene sulfide.

10. The method of claim 1, wherein a first amount of the complex is reacted with the dihaloaromatic monomer during the first polymerization reaction and a second amount of the complex is reacted with the prepolymer and the dihaloaromatic monomer during the second polymerization reaction, wherein the sulfur-containing monomer comprises the second amount of the complex.

11. The method of claim 1, further comprising purifying the polyarylene sulfide.

12. The method of claim 1, further comprising combining the polyarylene sulfide with one or more additives.

13. A molded product comprising the polyarylene sulfide of claim 1.

14. The method of claim 1, wherein the polyarylene sulfide has a yellowness index of about 15 or less.

15. The method of claim 1, wherein the organic amide solvent in the first polymerization reaction is N-methylpyrrolidone.

16. The method of claim 1, wherein the second polymerization reaction occurs in the presence of an organic amide solvent.

17. The method of claim 16, wherein the organic amide solvent in the second polymerization reaction is N-methylpyrrolidone.

18. The method of claim 16, wherein the molar ratio of the organic amide solvent to the sulfur-containing monomer in the second polymerization reaction is from about 2 to about 4.

19. The method of claim 1, wherein the molar ratio of the dihaloaromatic monomer to sulfur charged during the first polymerization reaction is from about 1.0 to about 1.2.

20. The method of claim 1, wherein the complex is formed by reacting an organic amide solvent, alkali metal sulfide, and water.

21. The method of claim 20, wherein the organic amide solvent used to form the complex is N-methylpyrrolidone.

22. The method of claim 20, wherein the alkali metal sulfide is formed from the reaction of sodium hydrogen sulfide and sodium hydroxide.

23. The method of claim 20, wherein the complex is formed in a third reactor.

24. The method of claim 20, wherein a stoichiometric excess of the alkali metal sulfide is provided to the reaction to form the complex.

25. The method of claim 1, wherein the complex includes sodium methylaminobutyrate and sodium hydrogen sulfide.

26. The method of claim 1, wherein the polyarylene sulfide is a linear polyphenylene sulfide.

27. The method of claim 1, wherein the molar ratio of any water present in the second polymerization reaction to the sulfur-containing monomer is less than about 0.2.

28. The method of claim 1, wherein the vapor removed from the second reactor is condensed.

29. The method of claim 1, wherein the vapor removed from the second reactor includes water.

* * * * *